A. R. BEHNKE.
DEMOUNTABLE RIM.
APPLICATION FILED MAR. 25, 1913.
1,093,375. Patented Apr. 14, 1914.
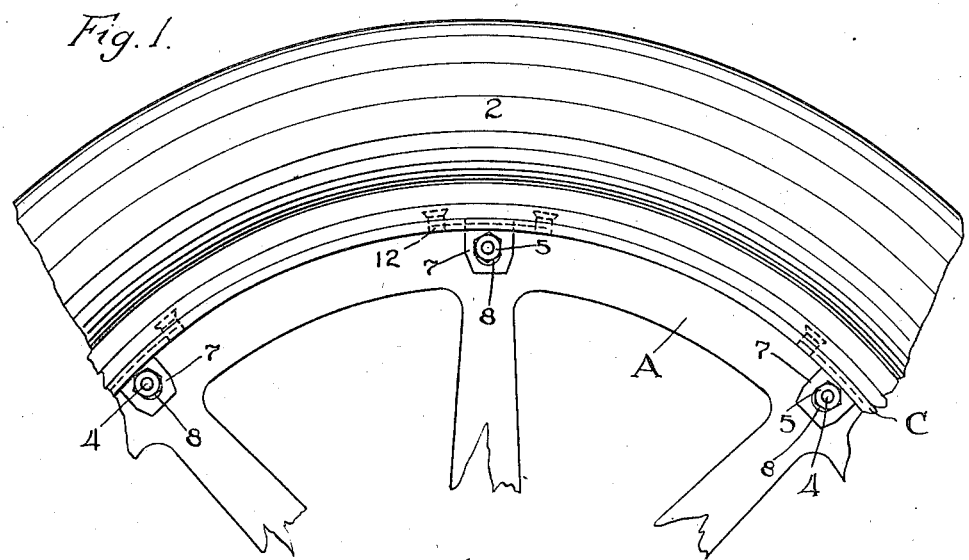
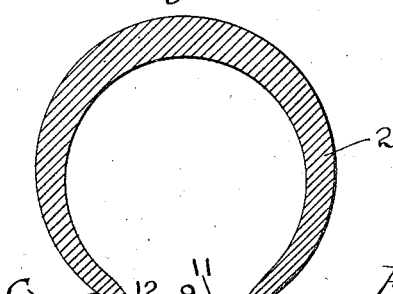
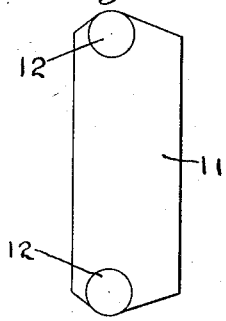
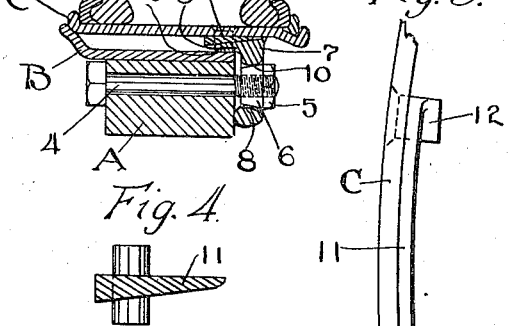
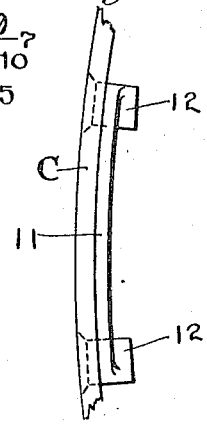
WITNESSES
INVENTOR
Albert R. Behnke
by Lothrop Johnson
his Attorneys.

UNITED STATES PATENT OFFICE.

ALBERT R. BEHNKE, OF ST. PAUL, MINNESOTA, ASSIGNOR OF ONE-HALF TO WILLIAM C. J. TIMMERMAN, OF ST. PAUL, MINNESOTA.

DEMOUNTABLE RIM.

1,093,375.      Specification of Letters Patent.      Patented Apr. 14, 1914.

Application filed March 25, 1913. Serial No. 756,712.

*To all whom it may concern:*

Be it known that I, ALBERT R. BEHNKE, a citizen of the United States, residing at St. Paul, in the county of Ramsey and State of Minnesota, have invented certain new and useful Improvements in Demountable Rims, of which the following is a specification.

My invention relates to improvements in fastening means for demountable automobile rims, its object being essentially to provide simple and efficient means for fastening the ordinary demountable rim upon a wheel which will allow the rim to be put upon or taken off without the necessity of the fastening means being removed from the wheel.

To this end the invention consists in the features of construction, combination, and arrangement of parts hereinafter described and claimed.

In the accompanying drawings forming part of this specification, Figure 1 is a side elevation of part of the wheel embodying my features of invention; Fig. 2 is a section through the wheel felly, rim, and tire; Fig. 3 is a plan view of an abutment for the rim; Fig. 4 is a section through the abutment; and Fig. 5 is a side view of the rim broken away and with an abutment secured thereto.

Referring to the drawings, A represents the wheel felly and B the felly band suitably secured to the felly.

C represents an ordinary type of demountable rim supporting the usual tire 2. One side of the felly band B is upturned to form a seat for the corresponding side of the rim, the opposite side of the felly band being cut off flush with the felly.

In carrying out my invention I provide a plurality of securing bolts 4 extending through the felly, the threaded ends of the securing bolts projecting beyond the cut off side of the felly band. Mounted upon the threaded end of each bolt is a nut 5 formed with an inwardly tapered or cone faced elongation 6. Mounted upon the cone faced elongation 6 is a clamping wedge 7, each wedge being formed with an elliptical opening a in its body portion for receiving the inner end of the corresponding nut and with an inwardly extending foot 9 which extends at right angles to the body portion, and has its outer face inclined to wedge in the space between the rim and felly band. The edge of the elliptical opening 7 nearest the foot 9 is rounded in cross-section as shown in Fig. 2 to form a central fulcrum 10 for the wedge upon the inwardly projecting end 6 of the supported nut.

To enable the clamping wedges to properly coöperate with the rim I provide the abutments 11. Each abutment 11 is in the form of an elongated peak and is provided at each of its ends with a pair of studs 12 which project from opposite faces of the abutment. As shown in Fig. 4 one face of the abutment is flat to fit against the rim and the other face is inclined to conform to the bevel of the upper edge of the corresponding wedge clamp. The abutments 11 are secured to the underface of the rim by means of the studs 12 extending from the flat face of each abutment, said studs being inserted in openings drilled through the rim and then being headed within the openings, as illustrated by dotted lines in Fig. 5. It is thus very easy to apply the abutments to the ordinary demountable rim, it being only necessary to drill a number of openings in the rim and secure the abutments in position in the manner set forth. With the abutments in position the studs projecting from the beveled faces of the abutments extend inwardly in parallel position to form guides for the wedges, the latter fitting between the studs, and thereby preventing creeping of the demountable rim on the felly. Thus with the parts in position as shown in Fig. 1, the screwing of the nuts upon the bolts 4 will, by reason of the inwardly tapered elongation of the nuts, force the wedge clamps inward. The inwardly extending upper portions of the wedges sliding inward as they do against the inclined faces of the abutments and between the studs 12 will tighten the rim upon the felly, and the studs 12 bearing against the sides of the wedges assist in holding the demountable rim in alinement upon the felly. The seating of the conical projections 6 of the nuts 5 upon the rounded ends 10 of the elongated openings 8 will also tend to force the clamping wedges 7 in a direction radially of the wheel, when the nuts are tightened upon the bolts, and thereby obtain a maximum degree of binding action between the wedges and the abutments. When it is desired to remove the rim the nuts will be unscrewed to the ends of the bolt without being taken off. The wedges may then be swung upon the inwardly tapered ends of the nuts, bringing the upper ends of the wedging clamps into depending position, so that the wedging clamps will not stand in the way of the removal of the rim. The demountable rim may thus be put on or taken off the wheel without removing the nuts or wedges.

I claim as my invention:

1. In a demountable rim structure for wheels, the combination with a wheel felly, and a demountable rim associated therewith, of a plurality of abutments arranged in spaced relation on said rim and interposed between the latter and said felly, each of said abutments comprising an elongated plate the opposite faces of which are provided with studs, the studs at the outer face of said plate being received by openings in the demountable rim and suitably secured therein to hold the abutment on the rim, the studs at the inner face of the abutment projecting toward the wheel felly, the faces of the abutments next adjacent to the wheel felly being inclined, a clamping wedge associated with each abutment and fitted between the inclined face of the latter and the wheel felly for coöperation with said inclined face, said clamping wedges also fitting between the studs at the inner faces of the abutments, and means for holding the clamping wedges in clamping relation to the rim.

2. In a demountable rim structure for wheels, the combination with a wheel felly, a band thereon, and a demountable rim associated therewith and provided with a series of inclined faces next adjacent to the felly band, of a clamping wedge associated with each of said inclined faces and provided with an inwardly-extending foot fitted between the inclined face and the felly band, said foot having its outer face inclined to coöperate with said inclined face of the rim, the body of each of said clamping wedges having an elongated opening the end of which next to the foot of the wedge is rounded in cross-section, a bolt arranged in the wheel felly for coöperation with each of said clamping wedges, and a nut carried by each of said bolts, each of said nuts having a conical elongation fitted in the elongated opening of the adjacent clamping wedge, and seated against the rounded end of said opening.

In testimony whereof I affix my signature in presence of two witnesses.

ALBERT R. BEHNKE.

Witnesses:
  H. SWANSON,
  H. S. JOHNSON.